(12) United States Patent
Rouh et al.

(10) Patent No.: US 7,978,883 B2
(45) Date of Patent: Jul. 12, 2011

(54) DEVICE FOR POSITIONING A USER BY DISPLAYING THE USER'S MIRROR IMAGE, A CORRESPONDING POSITIONING METHOD AND IMAGE-CAPTURE APPARATUS

(75) Inventors: Alain Rouh, Vincennes (FR); Gilles Monteilliet, rue des Closeaux (FR); Martin Cottard, Vaucresson (FR); Jean-Christophe Fondeur, Levallois Perret (FR)

(73) Assignee: Morpho, Paris (FR)

( * ) Notice: Subject to any disclaimer, the term of this patent is extended or adjusted under 35 U.S.C. 154(b) by 1256 days.

(21) Appl. No.: 11/579,420

(22) PCT Filed: May 20, 2005

(86) PCT No.: PCT/FR2005/001265
§ 371 (c)(1),
(2), (4) Date: Nov. 2, 2006

(87) PCT Pub. No.: WO2006/000670
PCT Pub. Date: Jan. 5, 2006

(65) Prior Publication Data
US 2007/0159548 A1    Jul. 12, 2007

(30) Foreign Application Priority Data

May 25, 2004   (FR) ...................................... 04 05649

(51) Int. Cl.
*G06K 9/00*  (2006.01)
*H04N 7/18*  (2006.01)
*H04N 5/222*  (2006.01)
*G03B 15/00*  (2006.01)

(52) U.S. Cl. ........ 382/118; 382/100; 382/117; 348/135; 348/333.03; 396/1

(58) Field of Classification Search .................. None
See application file for complete search history.

(56) References Cited

U.S. PATENT DOCUMENTS

| | | | |
|---|---|---|---|
| 5,506,632 A * | 4/1996 | Kohayakawa | ................ 351/205 |
| 5,664,235 A | 9/1997 | Ohmura et al. | |
| 5,751,836 A * | 5/1998 | Wildes et al. | ................ 382/117 |
| 6,289,113 B1 | 9/2001 | McHugh et al. | |
| 2002/0130961 A1* | 9/2002 | Lee et al. | ................ 348/333.03 |
| 2003/0012413 A1 | 1/2003 | Kusakari et al. | |
| 2003/0103030 A1 | 6/2003 | Wu | |
| 2004/0037452 A1 | 2/2004 | Shin | |

FOREIGN PATENT DOCUMENTS

DE   201 01 349 U1   5/2001

* cited by examiner

*Primary Examiner* — Samir A Ahmed
*Assistant Examiner* — Fred Hu
(74) *Attorney, Agent, or Firm* — Muncy, Geissler, Olds & Lowe, PLLC

(57) ABSTRACT

The present invention relates to a device (4) for positioning the face of a user relative to an image-capture apparatus (1), the positioning device comprising a picture-taking device (7) arranged to supply horizontally-reversed images, a display screen (5) for displaying the reversed images and connected to the picture-taking device, and means for superposing on the images displayed on the screen at least one positioning reference mark (6) for the user, the positioning reference mark and the displayed images lying substantially in the same plane. The invention also provides a corresponding method and image-capture apparatus.

9 Claims, 2 Drawing Sheets

DEVICE FOR POSITIONING A USER BY DISPLAYING THE USER'S MIRROR IMAGE, A CORRESPONDING POSITIONING METHOD AND IMAGE-CAPTURE APPARATUS

The present invention relates to a method and a device for positioning a user by simultaneously displaying the user's mirror image together with positioning reference marks.

By way of example, such a positioning device can be used for positioning the face of a user in front of an image-capture apparatus usable for identification purposes by face recognition or by recognizing the user's eyes.

BACKGROUND OF THE INVENTION

Automatic devices for identifying individuals by means of the iris of the eye comprise one or two cameras for capturing images of the individual's irises. The cameras used present limited depth and width of field which makes it necessary for the individual to be accurately positioned relative to the cameras in order to have images that provide sufficient quality to enable irises to be recognized and the individual to be identified.

Proposals have thus been made to associate the identification apparatus with a device for positioning the user of the identification apparatus.

A positioning device is known that detects the position of the user and sends visual signals to the user enabling the user to correct position if it is not appropriate. Nevertheless, those signals can be wrongly interpreted, making it impossible to achieve correct positioning without the intervention of an operator.

There thus exist positioning devices of the above type associated with a voice synthesis system for giving the user verbal instructions on repositioning. That method nevertheless requires prior knowledge of the language(s) spoken by users and it is difficult to implement in noisy environments. In addition, generating and uttering voice messages is relatively time consuming, and that is incompatible with a maximum duration for identification of the order of 3 minutes that is presently required when the number of people to be identified is large.

To solve those drawbacks, proposals have been made to use a mirror on which there are reference marks for positioning the eyes of the user, a user being correctly positioned when the eyes of the user's reflection on the mirror are superposed on the positioning reference marks. Correcting positioning is then very intuitive. Nevertheless, the reflection of the user and the positioning reference marks do not then lie in the same optical plane. Unfortunately, there exist people who have a preferred eye for positioning in three dimensions. When aligning themselves on the reference marks, such people tend unconsciously to use only that one eye known as the dominant eye. This leads to a parallax error that leads to wrong positioning. In addition, the existence of two optical planes runs the risk of leading to problems of accommodation for a user who cannot see both the reference marks and the user's own reflection in focus simultaneously. These problems of accommodation can be detrimental to positioning.

OBJECT OF THE INVENTION

An object of the invention is to provide means enabling the user to be positioned quickly and accurately.

BRIEF SUMMARY OF THE INVENTION

To this end, the invention provides a device for positioning the face of a user relative to an image-capture apparatus, the positioning device comprising a picture-taking device arranged to supply horizontally-reversed images, a display screen for displaying the reversed images and connected to the picture-taking device, and means for superposing on the images displayed on the screen at least one positioning reference mark for the user, the positioning reference mark and the displayed images lying substantially in the same plane.

Thus, the screen acts as a mirror in which the user can see his or her reflection and can correct position by getting into alignment with the positioning reference marks. Since the image of the user and the images of the reference marks all lie in the same plane, there is no problem with parallax, and the user experiences no difficulty with accommodation in order to see the user's own image and the reference mark simultaneously and in focus. The device of the invention is also intuitive in character which enables the user to take up the correct position quickly.

According to a first particular characteristic, the superposition means are arranged to superpose two positioning reference marks on two items of the user's body, and the device includes a member for measuring a distance between the user and the picture-taking device, means for determining on the image of the user at said distance a distance between the two elements of the user's body, and adaptation means for adapting the spacing of the positioning reference marks relative to the images as a function of the determined distance that exists between the elements of the user's body.

On the assumption that both eyes of the user are being positioned, there is a risk that a user will have an interocular distance that is smaller (or greater) than the spacing between the positioning marks, for example. Without correction, in order to bring both eyes into alignment with the positioning marks, such a user would need to take up a position that is too close (or too far away) from the picture-taking device, in comparison with a user having a standard interocular distance. The adaptation means serve to correct for the morphological variations that exist between individuals in order to achieve positioning that is relatively accurate.

In which case, and preferably, the adaptation means comprise a control member for controlling magnification of the images displayed on the screen.

Thus, to return to the above assumption, the relatively small (or great) interocular distance of a user is compensated by magnifying (or reducing) the image of the user. This mode of adaptation is particularly simple.

According to a second particular characteristic, the positioning device includes means for detecting any misalignment in the images between the positioning reference mark and the user, and means for amplifying the misalignment on the screen.

The errors that are detected may be user offsets sideways, vertically, or in depth. Amplifying positioning errors makes it easier for the user to correct position.

The invention also provides an apparatus for capturing at least one image of a user's eye, the apparatus including at least one image acquisition camera, the capture apparatus comprising a positioning device presenting any of the above characteristics, the screen of the positioning device being mounted in the capture device in such a manner that when the user looks at the screen, said eye of the user lies substantially on the axis of the acquisition camera.

The user's vision during positioning is then properly directed for image capture such that the operation of capturing the image can follow on immediately from the positioning operation without any need for the user to look in some other direction.

The invention also provides a method of positioning a user relative to an image capture apparatus, the method comprising the steps of filming images of the user substantially continuously, of horizontally reversing the filmed images, and of presenting the reversed images to the user together with at least one positioning reference mark superposed thereon, the positioning reference mark and the images being presented substantially in the same plane.

Other characteristics and advantage of the invention appear on reading the following description of two particular and non-limiting embodiments of the invention.

BRIEF DESCRIPTION OF THE FIGURES

Reference is made to the accompanying drawings, in which.

DETAILED DESCRIPTION

The invention is described herein in application to a device for taking images of the eye of a user in order to identify the user.

Figure 1:
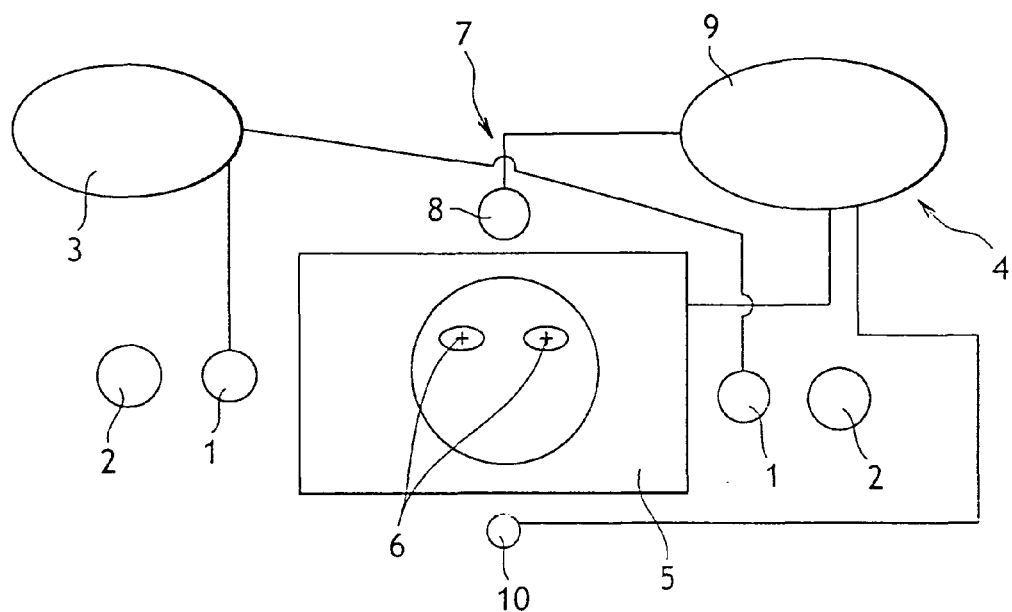
FIG. 1 is a diagrammatic face view of an image-capture apparatus in a first embodiment of the invention.

With reference to FIG. 1, and in a first embodiment referred to as a "direct vision" embodiment, the image-capture apparatus comprises, in a manner that is itself conventional, two cameras 1 for acquiring infrared images of the eyes of the user, and two sources 2 of infrared illumination. The cameras 1 are disposed on a horizontal line at positions that are spaced apart from each other so that each of them takes images of one of the eyes of a user when the user is in a reference position relative to the cameras. This reference position is a position that enables images of sufficient quality to be obtained of both of the eyes of the user. The cameras 1 are connected to a computer processor unit 3, known in itself, that processes the images and identifies the user by recognizing the user's irises.

The image-capture apparatus includes a positioning device given overall reference 4.

The positioning device 4 comprises a screen 5 placed between the two cameras 1. Two positioning reference marks 6 are marked on the surface of the screen 5 in positions that are horizontally spaced apart by a distance that corresponds to a standard interocular distance for a user in the reference position and as a function of the nominal magnification of the image.

The positioning device 4 also comprises a picture-taker device generally referenced 7 and comprising a camera 8 that operates in the visible, connected to a control unit 9 that horizontally reverses the images delivered by the camera 8. The camera 8 includes a motor-driven zoom lens. The control unit 9 is arranged to control the motor-driven zoom lens and is connected to the screen 5.

The capture apparatus includes a telemeter 10 connected to the control unit 9 and operating in the infrared.

When a image comes up in front of the image-capture apparatus, the camera 8 continuously takes images of the face of the user. These images are reversed horizontally by the control unit 9 which transmits the reverse images to the screen 5.

For the user, the screen 5 thus appears as a mirror having positioning reference marks 6 marked thereon with which the user is required to align the images of the eyes. The images displayed on the screen 5 and the positioning reference marks 6 are situated in the same plane such that the images and the reference marks are seen clearly and without parallax. In addition, using a single camera 8 eliminates problems of a dominant eye or master eye which arise with binocular vision.

The telemeter 10 continuously measures the distance between itself and the user. At a predetermined instant, the measured distance and an image of the user at said distance are used by the control unit 9 to determine the interocular distance of the user. If the interocular distance of the user is different from the standard interocular distance, then the zoom lens is controlled to adapt the magnification of the image to the ratio between the user's interocular distance and the standard interocular distance.

The user corrects position in order to bring the user's eyes as seen on the screen 5 into alignment with the positioning reference marks 6.

When the positioning reference marks 6 and the images of the user's eyes are superposed, the cameras 1 capture images of the user's eyes. It should be observed that when the user looks at the screen 5, the user's eyes are substantially in line with the cameras 1. Conventional recognition is then performed on the user's irises in order to identify the user.

Elements identical or analogous to those described above are given identical numerical references in the description below of the second embodiment.

Figure 2:
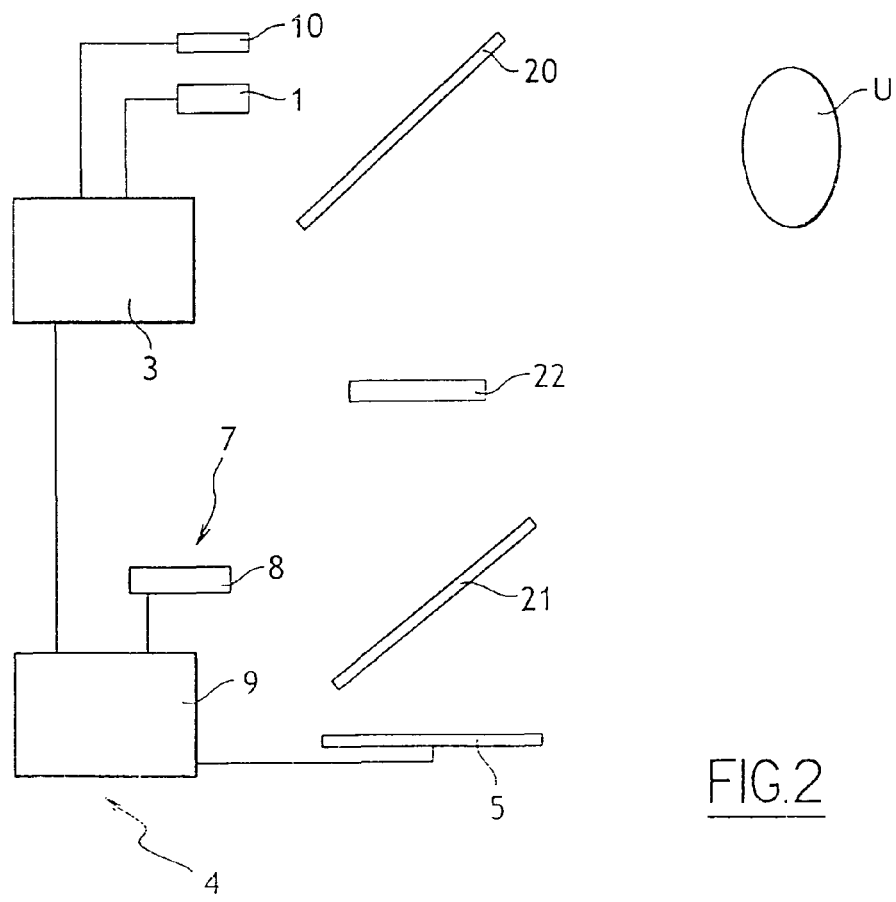
FIG. 2 is a diagrammatic side view of an image-capture apparatus in a second embodiment of the invention.

With reference to FIG. 2, and in the second embodiment with folded light paths, the camera 8 of the picture-taking device 7 and the screen 5 of the positioning device 4 are no longer disposed in the immediate vicinity of the cameras 1 as in the first embodiment.

In the second embodiment, the positioning device further comprises two parallel slate beam-splitters 20, 21. The beam-splitter 20 slopes in front of the cameras 1 and the telemeter 10 which are adjacent. The beam-splitter 20 is a spectrum separator arranged in conventional manner to transmit infrared radiation and to reflect visible radiation. The beam-splitter 20 is at 45° relative to the optical axes of the cameras 1. The beam-splitter 21 is a flux separator which transmits a fraction of the visible light flux coming from the beam-splitter 20 towards the screen 5 and which reflects a corresponding proportion of the visible light flux towards the camera 8.

An accommodation-canceling member 22 is placed between the beam-splitters 20 and 21. The accommodation-canceling member 22 is constituted in this case by a lens arranged in conventional manner to perform focusing at infinity. The beam-splitters 20 and 21, the accommodation-canceling member 22, and the screen 5 are in alignment substantially on the same axis.

The positioning device in the second embodiment operates identically to that of the first embodiment.

The image visible to the user U is reflected successively on the beam-splitters 20 and 21 so as to be captured by the camera 8.

The screen 5 can be seen through the beam-splitter 21 and the accommodation-canceling member 22, and it is reflected in the beam-splitter 20 towards the user U. Because of the accommodation-canceling member 22, the user U has no need to accommodate vision in order to see the screen 5 sharply.

The cameras 1 and the telemeter 10 act directly through the beam-splitter 20.

The device constituting the second embodiment presents the advantage that the width of the screen 5 no longer depends on the spacing between the cameras 1, as is the case for the first embodiment.

Figure 3:
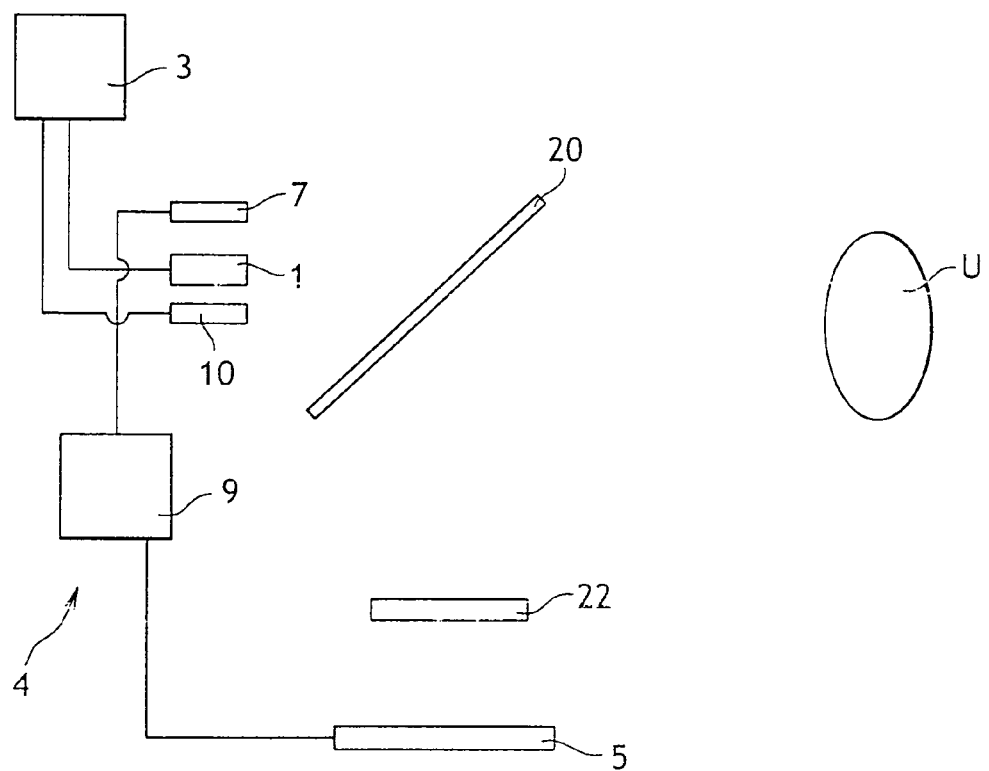
FIG. 3 is a view analogous to FIG. 2 showing a variant of the second embodiment.

In a variant of this second embodiment, as shown in FIG. 3, the beam-splitter 21 is omitted and the camera 8 is placed in the vicinity of the cameras 1 behind the beam-splitter 20. Since the beam-splitter 20 transmits radiation that is infrared, the camera 8 used must be sensitive to this radiation.

The screen 5 is disposed directly behind the accommodation-canceling member 22.

It is also possible to use cameras 1 and 8 that operate in the visible, by using a beam-splitter that transmits a proportion of the visible.

In this example, the control unit 9 also incorporates a member for detecting misalignment between the positioning reference marks and the eyes of the user and means for amplifying such misalignment that are arranged to enlarge the image and the positioning reference marks in order to amplify the positioning error as the user comes closer to the reference position, thus making positioning easier.

The amplification means are also arranged to amplify lateral and/or vertical misalignment by displacing the images displayed on the screen in corresponding manner relative to the positioning reference marks. Wrong positioning in the depth direction, as detected by the telemeter, can also be amplified, e.g. by enlarging the images when the user is too close or by reducing the images when the user is too far away.

The detection and amplification means in this example are computer programs for image processing.

Naturally, the invention is not limited to the embodiments described but also covers any variants coming within the ambit of the invention as defined by the claims.

The positioning device of the invention is usable for applications other than capturing images of the eyes for identification purposes, and for example it can be used for capturing images of faces for biometric recognition thereof, or more simply in an automatic photograph-taking booth.

The processor unit 8 could be replaced by optical means for horizontally reversing images, such as a lens or a mirror.

Although the positioning reference marks are shown in the form of crosses in FIG. 1, other shapes could naturally be used, such as circles. The positioning reference marks can also be superposed on the images by an image processing method, such as image overlays or the like, instead of being marked on the screen. The spacing between the reference marks can thus be adapted as a function of the interocular distance of the user.

Adapting the spacing of the positioning reference marks relative to the displayed images is optional, and could be omitted, for example when variation in the interocular distance has no harmful influence on positioning.

The means for detecting misalignment and the amplification means are usable in all of the embodiments and variants thereof. These means could alternatively be omitted.

Although the beam-splitters are described as being in the form of plates, the beam-splitters could be formed using any other means, and in particular using prisms.

In the variant of the second embodiment, the positions of the screen 5 and the camera 8 can be interchanged.

Although an accommodation-canceling member is located in front of the screen and the picture-taking device in the second embodiment, the positioning device need not have such a member.

The accommodation-canceling member 22 may be disposed somewhere other than between the two semi-reflecting plates 20, 21, and in particular between the screen 5 and the semi-reflecting plate 21. The accommodation-canceling member 22 is optional and could be omitted, in particular when the light path between the user and the screen is longer than 35 centimeters (cm), a distance beyond which it is assumed that most individuals do not have problems of accommodation.

The telemeter is also optional.

The invention claimed is:

1. A device for positioning the face of a user relative to an image-capture apparatus, the device comprising a picture-taking device arranged to supply horizontally-reversed images, a display screen for displaying the reversed images and connected to the picture-taking device, and means for superposing on the images displayed on the screen at least one positioning reference mark for the user, the positioning reference mark and the displayed images lying substantially in a same plane, wherein the superposition means are arranged to superpose two positioning reference marks on two items of the user's body, and in that the device includes a member for measuring a distance between the user and the picture-taking device, means for determining on the image of the user at said distance a distance between the two elements of the user's body, and adaptation means for adapting the spacing of the positioning reference marks relative to the images as a function of the determined distance that exists between the elements of the user's body.

2. A device according to claim 1, wherein the adaptation means comprise a control member for controlling magnification of the images displayed on the screen.

3. A device according to claim 1, including detector means for detecting any misalignment in the images between the positioning reference mark and the user, and amplification means for amplifying the misalignment on the screen.

4. A device according to claim 1, including an optical accommodation-canceling device disposed in front of the screen.

5. Apparatus for capturing at least one image of a user's eye, the apparatus including at least one image acquisition camera and the capture apparatus comprising a positioning device according to claim 1, the screen of the positioning device being mounted in the capture device in such a manner that when the user looks at the screen, said eye of the user lies substantially on the axis of the acquisition camera.

6. Apparatus according to claim 5, wherein the screen is mounted in the immediate proximity of the acquisition camera.

7. Apparatus according to claim 5, including at least one beam-splitter disposed between the screen and the acquisition camera.

8. Apparatus according to claim 7, including a first plate beam-splitter extending at a slope in front of the acquisition camera and having a non-reflecting side pointing towards the acquisition camera and a reflecting side looking at a reflecting side of a second plate beam-splitter extending parallel to the first beam-splitter and having a non-reflecting side facing the screen, the picture-taking device facing towards the reflecting side of the second beam-splitter.

9. A method of positioning a user relative to an image capture apparatus, the method comprising the steps of filming images of the user substantially continuously, of horizontally reversing the filmed images, and of presenting the reversed images to the user together with at least one positioning reference mark superposed thereon, the positioning reference mark and the images being presented substantially in a same plane, wherein two positioning reference marks are superposed on two items of the user's body, and a distance is measured between the user and the picture-taking device, on the image of the user at said distance a distance is determined between the two elements of the user's body, and the spacing of the positioning reference marks relative to the images is adapted as a function of the determined distance that exists between the elements of the user's body.

* * * * *